(12) United States Patent
Naghi et al.

(10) Patent No.: US 6,666,926 B2
(45) Date of Patent: Dec. 23, 2003

(54) METHOD AND APPARATUS FOR CLEANING A COMPUTER MOUSE DEVICE

(75) Inventors: David Naghi, Los Angeles, CA (US); Herschel Naghi, Los Angeles, CA (US); Eric A. Hanscom, San Pedro, CA (US)

(73) Assignee: Technology Creations, Inc., Los Angeles, CA (US)

( * ) Notice: Subject to any disclaimer, the term of this patent is extended or adjusted under 35 U.S.C. 154(b) by 149 days.

(21) Appl. No.: 09/792,787

(22) Filed: Feb. 22, 2001

(65) Prior Publication Data

US 2001/0005915 A1 Jul. 5, 2001

Related U.S. Application Data

(63) Continuation-in-part of application No. 09/081,163, filed on May 18, 1998, now Pat. No. 6,212,726.

(51) Int. Cl.$^7$ ................................................. B08B 9/00
(52) U.S. Cl. ....................... 134/8; 134/22.1; 134/22.18; 134/21; 15/304; 15/344
(58) Field of Search .............................. 134/6, 8, 22.1, 134/22.18, 22.12, 33, 21, 42; 15/304, 415.1, 341, 344

(56) References Cited

U.S. PATENT DOCUMENTS

| | | | |
|---|---|---|---|
| 1,488,777 A | * 4/1924 | Clements | 604/212 |
| 1,576,128 A | * 3/1926 | Ballard | 604/26 |
| 3,789,452 A | 2/1974 | Nemoto | 15/210 |
| 3,978,520 A | 8/1976 | Nowicki et al. | 358/10 |
| 4,065,798 A | 12/1977 | Sugisaki et al. | 360/128 |
| 4,100,643 A | 7/1978 | Horian et al. | 15/246 |
| 4,128,909 A | 12/1978 | Kawabe et al. | 15/104 A |
| 4,183,819 A | 1/1980 | Stolove | 252/144 |
| 4,263,692 A | 4/1981 | Gremillion | |
| 4,454,551 A | 6/1984 | Clausen et al. | 360/137 |
| 4,622,617 A | 11/1986 | Fritsch | 360/128 |
| 4,631,614 A | 12/1986 | Davis et al. | 360/128 |
| 4,683,603 A | 8/1987 | Purlia et al. | 15/104.94 |
| 4,716,485 A | 12/1987 | Yeung | 360/128 |
| 4,751,600 A | 6/1988 | Cecil et al. | 360/128 |
| 4,760,618 A | 8/1988 | Chapin, Jr. | 15/104.93 |
| 4,840,842 A | 6/1989 | Yamaguchi et al. | 428/323 |
| 4,843,508 A | 6/1989 | Mannheimer et al. | 360/128 |
| 5,025,526 A | 6/1991 | Ichitsubo et al. | 15/210 R |
| 5,144,775 A | 9/1992 | Bakanowsky, III | 51/205 WG |
| 5,148,572 A | 9/1992 | Wells et al. | 15/118 |
| 5,153,254 A | 10/1992 | Chen | 524/505 |
| 5,177,906 A | 1/1993 | Balding et al. | 51/205 WG |
| 5,179,808 A | 1/1993 | Bakanowsky, III | 51/205 WG |

(List continued on next page.)

FOREIGN PATENT DOCUMENTS

| | | | |
|---|---|---|---|
| GB | 2268049 | 1/1994 | |
| JP | 2-288084 A | 11/1990 | H01R/43/00 |

Primary Examiner—Randy Gulakowski
Assistant Examiner—Saeed Chaudhry
(74) Attorney, Agent, or Firm—Procopio, Cory, Hargreaves & Savitch, LLP

(57) ABSTRACT

A method for cleaning a computer mouse device with a computer mouse ball located in an interior ball cavity that has a plurality of mouse contact rollers includes removing the computer mouse ball from the interior ball cavity; inserting a cleaning surface of a mouse cleaner into the interior ball cavity, the cleaning surface attached to a lumen and in communication with a pressure mechanism via the lumen, the cleaning surface including an expandable and collapsible body; actuating the pressure mechanism so as to cause an operative effect at the cleaning surface, the operative effect being the expansion of the body within the mouse cavity so that the cleaning surface compresses against the mouse contact rollers; and rotating the cleaning surface so as to cause one or more of the plurality of mouse contact rollers to roll and thereby be cleaned by the cleaning surface.

14 Claims, 2 Drawing Sheets

U.S. PATENT DOCUMENTS

| | | | |
|---|---|---|---|
| 5,181,292 A | 1/1993 | Aghachi | 15/236.08 |
| 5,187,902 A | 2/1993 | Bakanowsky, III | 51/205 R |
| 5,201,093 A | 4/1993 | Wells et al. | 15/210.1 |
| 5,243,730 A | 9/1993 | Ichitsubo et al. | 15/210.1 |
| 5,336,330 A | 8/1994 | Shumway et al. | 134/8 |
| 5,339,486 A | 8/1994 | Persic, Jr. | 15/244.1 |
| 5,486,845 A | 1/1996 | Chait | 345/163 |
| 5,519,910 A | 5/1996 | Messina | 15/104.002 |
| 5,615,438 A | 4/1997 | Field | 15/104.2 |
| 5,970,559 A | 10/1999 | Christy | |
| 6,081,956 A * | 7/2000 | Boys | 15/21.2 |

* cited by examiner

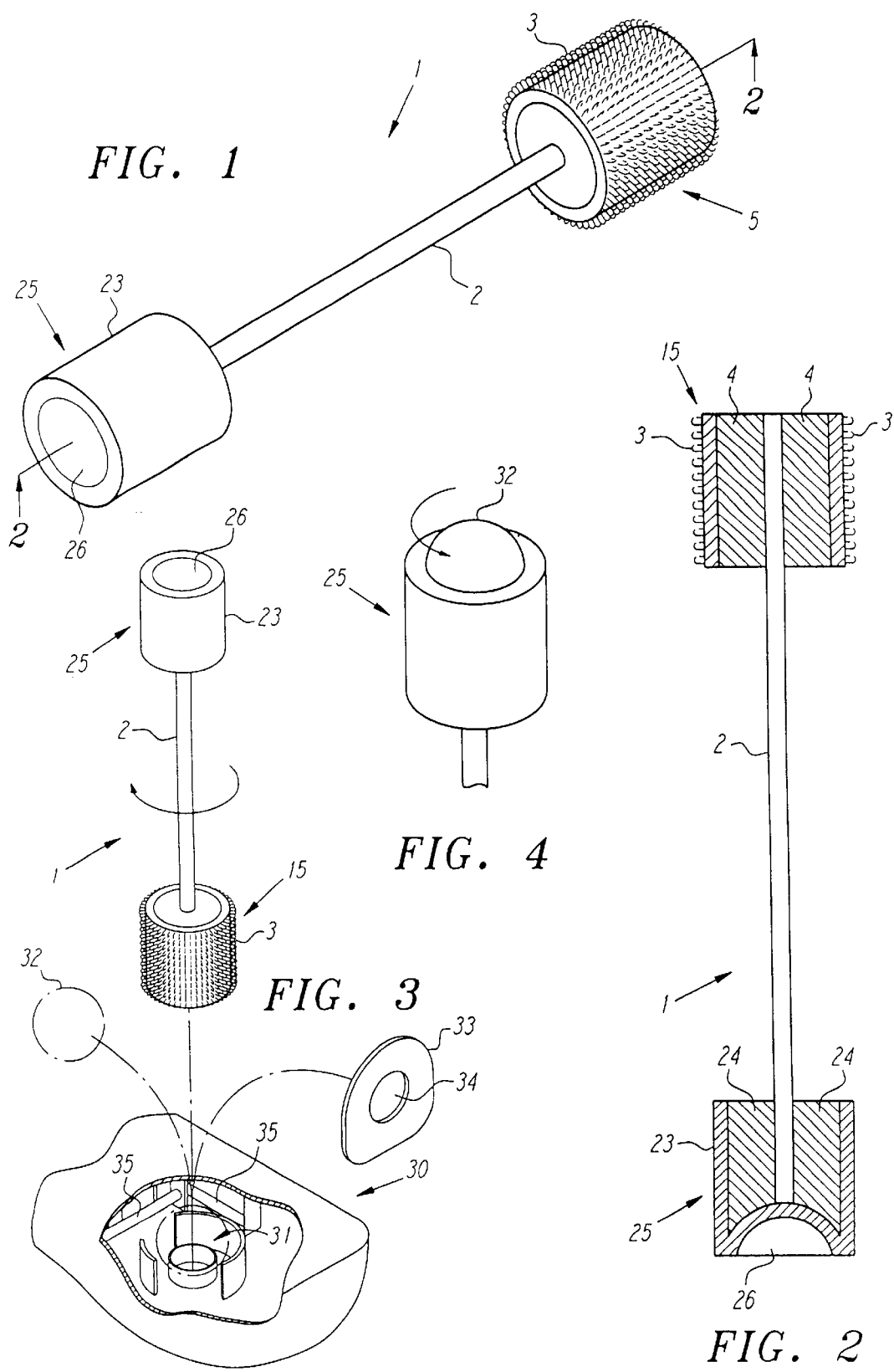

METHOD AND APPARATUS FOR CLEANING A COMPUTER MOUSE DEVICE

CROSS-REFERENCE TO RELATED APPLICATION

This application is a continuation-in-part application of application Ser. No. 09/081,163, filed May 18, 1998 now U.S. Pat. No. 6,212,726.

FIELD OF THE INVENTION

The present invention is in the field of a computer mouse device cleaner.

BACKGROUND OF THE INVENTION

A computer mouse device is an accessory that is commonly used as a companion to a computer keyboard. The mouse has a mouse ball that is located in an interior ball cavity. The mouse ball is held loosely inside of the interior ball cavity by a removable cover that has an opening with a smaller diameter than the mouse and extends outwardly through the cover opening when the mouse is positioned ball side down. In use, movement of the mouse across a mouse pad or other flat surface causes the mouse ball to roll inside of the interior ball cavity, thereby causing mouse contact rollers inside of the mouse to roll. The movement of the mouse contact rollers is then translated into instructions that ultimately cause a cursor on a connected computer screen to move in response to movement of the mouse ball across the mouse pad.

Over time, the mouse ball can become dirty, or even sticky. In addition, dust, hair and other contaminants can get inside of the mouse through the opening in the removable cover and stick on the mouse contact rollers or mechanical parts. When either of these things happen, the ability of the mouse to properly function will be impaired, or the mouse may even cease functioning. To remedy such a situation, the mouse cover must be removed and the parts of the mouse must be cleaned.

At present, there is no inexpensive, easy way to clean a dirty mouse device. If the cover is removed, the mouse ball can easily be removed. However, if the mouse ball or the inside of the mouse are not properly cleaned, the mouse may still not function properly even after it is cleaned. This can cause frustration by users, or even result in discarding a dirty mouse in favor of a new, clean mouse.

One cleaning kit that is presently being sold for cleaning mouse devices is called Mouse Doctor™. This kit instructs its user to first remove the ball from the mouse device. Next, compressed air is sprayed into the interior cavity to remove dust particles. Next, cleaning pads and cleaning swabs are used to wipe the mouse contact rollers clean and the ball is replaced for operation. If the mouse contact rollers have a heavy build-up of grime, the user is instructed to saturate the swab with isopropyl alcohol before scrubbing the rollers. However, this cleaning kit is relatively expensive, and the cleaning process is cumbersome.

Accordingly, there is a need for an inexpensive, simple, easy to use cleaning kit that can be used to clean computer mouse devices and thereby increase their performance.

SUMMARY OF THE INVENTION

The present invention is generally directed to an improved computer mouse device cleaner and a method for using the cleaner.

An additional aspect of the invention involves a method for cleaning a computer mouse device with a computer mouse ball located in an interior ball cavity that has a plurality of mouse contact rollers and a plurality of mechanical parts. The method includes removing the computer mouse ball from the interior ball cavity; inserting a cleaning surface of a mouse cleaner into the interior ball cavity; and rotating the cleaning surface with a motor of the mouse cleaner so as to cause one or more of the plurality of mouse contact rollers to roll and thereby be cleaned by the cleaning surface.

Another aspect of the invention involves a method for cleaning a computer mouse device with a computer mouse ball located in an interior ball cavity that has a plurality of mouse contact rollers and a plurality of mechanical parts. The method includes removing the computer mouse ball from the interior ball cavity; providing a mouse cleaner including a handle; connecting an attachable, disposable cleaning surface to the handle; inserting the cleaning surface into the mouse; rotating the cleaning surface so as to permit removal of mouse contaminants from the plurality of mouse contact rollers and the plurality of mechanical parts; removing the cleaning surface from the mouse; and disposing the cleaning surface after a single use.

A further aspect of the invention involves a method for cleaning a computer mouse device with a computer mouse ball located in an interior ball cavity that has a plurality of mouse contact rollers and a plurality of mechanical parts. The method includes removing the computer mouse ball from the interior ball cavity; inserting a cleaning surface of a mouse cleaner into the interior ball cavity, the cleaning surface attached to a lumen and in communication with a pressure mechanism via the lumen; actuating the pressure mechanism so as to cause an operative effect at the cleaning surface; and rotating the cleaning surface so as to cause one or more of the plurality of mouse contact rollers to roll and thereby be cleaned by the cleaning surface.

An additional aspect of the invention involves a computer mouse cleaner for cleaning a computer mouse device with a computer mouse ball located in an interior ball cavity that has a plurality of mouse contact rollers and a plurality of mechanical parts. The mouse cleaner includes a motor, a shaft rotatably driven by the motor, and a cleaning surface connected to the shaft for rotatable movement therewith for cleaning the plurality of mouse contact rollers and the plurality of mechanical parts in the interior ball cavity. In implementations of this aspect of the invention, the computer mouse cleaner may additionally include a cleaning surface cleaning mechanism to remove dirt and other debris collected on the cleaning surface during cleaning and/or an electrostatic mechanism to add an electrostatic charge to the cleaning surface to help attract dust and other charged contaminant particles to the cleaning surface.

Another aspect of the invention involves a computer mouse cleaner kit for cleaning a computer mouse device with a computer mouse ball located in an interior ball cavity that has a plurality of mouse contact rollers and a plurality of mechanical parts. The mouse cleaner kit includes a handle, and multiple disposable cleaning surfaces adapted to be detachably connected to the handle.

A still further aspect of the invention involves a computer mouse cleaner for cleaning a computer mouse device with a computer mouse ball located in an interior ball cavity that has a plurality of mouse contact rollers and a plurality of mechanical parts. The mouse cleaner includes a handle and a cleaning surface connected to the handle. The cleaning surface is pre-saturated with a cleaning substance.

An additional aspect of the invention involves a computer mouse cleaner for cleaning a computer mouse device with a computer mouse ball located in an interior ball cavity that has a plurality of mouse contact rollers and a plurality of mechanical parts. The mouse cleaner includes an expandable and collapsible cleaning body including a cleaning surface and an interior, a lumen in communication with the interior of the expandable and collapsible cleaning body, and a pressure mechanism in communication with the lumen and the interior of the expandable and collapsible cleaning body to expand the body when the body is within the mouse cavity so that the cleaning surface compresses against the mouse contact rollers and the plurality of mechanical parts to enhance cleaning of these parts.

Another aspect of the invention involves a computer mouse cleaner for cleaning a computer mouse device with a computer mouse ball located in an interior ball cavity that has a plurality of mouse contact rollers and a plurality of mechanical parts. The mouse cleaner includes a cleaning body including a cleaning surface, an interior, and a plurality of pores in communication with the interior, a lumen in communication with the interior of the cleaning body, and a pressure mechanism in communication with the lumen and the interior of the cleaning body to deliver cleaning fluid through the lumen and plurality of pores to the cleaning surface.

A further aspect of the invention involves a computer mouse cleaner for cleaning a computer mouse device with a computer mouse ball located in an interior ball cavity that has a plurality of mouse contact rollers and a plurality of mechanical parts. The mouse cleaner includes a cleaning body including a cleaning surface, an interior, and a plurality of pores in communication with the interior, a lumen in communication with the interior of the cleaning body, and a pressure mechanism in communication with the lumen and the interior of the cleaning body to create a vacuum force at the cleaning surface by drawing air and other debris through the plurality of pores and the lumen.

Further objects and advantages will be apparent to those skilled in the art after a review of the drawings and the detailed description of the preferred embodiments set forth below.

BRIEF DESCRIPTION OF THE DRAWINGS

FIG. 1 is a drawing of a preferred embodiment of a computer mouse device cleaner made in accordance with the present invention.

FIG. 2 is a cross-sectional view of FIG. 1.

FIG. 3 is a representation of the use of the preferred embodiment shown in FIG. 1 with a generic computer mouse device viewed from its underneath side with its ball and ball cover removed.

FIG. 4 is a representation of the use of the preferred embodiment shown in FIG. 1 to clean a mouse ball.

DETAILED DESCRIPTION OF THE PREFERRED EMBODIMENTS

Figure 5:
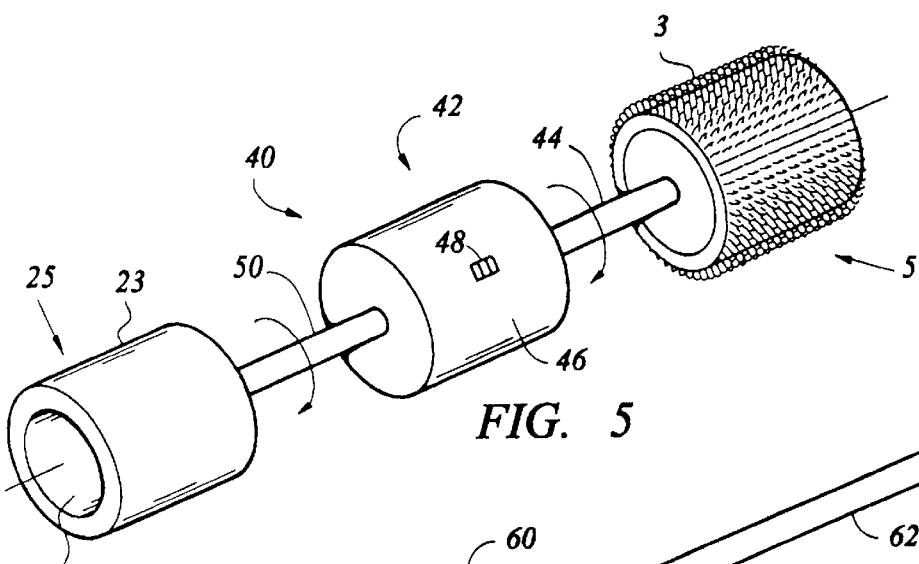
FIG. 5 is a drawing of another embodiment of a computer mouse device cleaner made in accordance with the present invention.

In the preferred embodiment of the present invention shown in FIG. 1, a computer mouse cleaner, generally designated as 1, has a handle 2, a first cleaning surface 3 attached to a first end 5 of the handle 2, a second cleaning surface 23 attached to a second end 25 of the handle 2, and a ball cleaning surface 26 attached to the second end 25 of the handle 4. The handle 2 is sized and shaped so as to allow a person to hold the handle and rotate the mouse cleaner. As shown in FIG. 2, a compressible material 4 is located between the handle 2 and the first cleaning surface 3 while a compressible material 24 is located between the handle 2 and the second cleaning surface 23. The ball cleaning surface 26 has a curved surface that is nested at the second end 25 of the handle 2; in other words, the cleaning surface extends beyond the second end 25 of the handle 2 such that the actual cleaning surface is generally in the shape of a bowl or a hemisphere that is attached to the handle 4. Either or both of cleaning surfaces 3 and 23 can be detachable from the handle 2.

If the cleaning surfaces 3 and 23 are detachable, they can be included in a kit. One simple and inexpensive way to manufacture a cleaner using detachable cleaning surfaces is to affix the cleaning surfaces on top of a portion of the handle (not shown) that is then connected to a base of the handle by a snap fit, a friction fit or some other means of connection. Conceptually, this would be similar to applying the cleaning surfaces to caps that could be snapped onto a highlighting marker or pen, for example. If a compressible material is to be used, the compressible material could be affixed or laminated to the portion of the handle first, and then the cleaning surfaces could be affixed on top of the compressible material.

Although the preferred embodiment is shown as having the cleaning surfaces 3 and 23 attached to a single handle 2, this is not required. Each could be attached to a single handle, either permanently or detachably. Also, it is not required that the ball cleaning surface 26 be attached to the second end 25 or be in contact with the second cleaning surface 23. It too could be its own product or device, attached to its own handle, either permanently or detachably.

The cleaning surfaces 3 and 23 should be sized so as to fit into an interior ball cavity of a mouse device such that rotation of the handle 2 relative to one or more interior mouse contact rollers 35 will cause at least one interior mouse contact roller to roll and thereby be cleaned by the cleaning surface. The cleaning surfaces 3 and 23 can be cylindrical, as shown in FIG. 1; alternatively, they could be in the shape of a ball, or a modified ball. It is preferred that the cleaning surfaces have a diameter that is approximately equal to, or greater than, the diameter of the mouse ball. This allows the cleaning surfaces 3 and 23 to approximate the movement of the mouse ball 32 within the interior ball cavity 31 and its rolling action upon the rollers 35 and thereby clean the rollers 35 by a rolling action. It is especially preferred that multiple rollers 35 are cleaned by a rolling action at the same.

In order to use the computer mouse device cleaner of the present invention, the computer mouse cover 33 with hole 34 on the underside of the mouse is removed and the mouse ball 32 is removed from the interior ball cavity 31. The first step of cleaning the inside of the mouse is to remove hair, lint and dust that may be attached to rollers 35 and mechanical parts inside of the mouse. This is done by inserting the first end 5 of the mouse cleaner 1 inside of the interior ball cavity 31 and rotating it to collect the contaminants on the first cleaning surface 3. The second step of cleaning the inside of the mouse is to remove residue from the rollers 35. This is done by inserting the second end 25 of the mouse cleaner 1 inside of the interior ball cavity 31 and rotating it to cause the rollers 35 to rotate and thereby "scrub" the surface of the rollers.

In an especially preferred method according to the present invention, a liquid solvent is also used to help clean the rollers 35. The liquid solvent is used to help loosen up hardened contaminants, and isopropyl alcohol is a preferred solvent. The solvent can be applied to the first cleaning surface 3 when it is initially inserted into the interior ball cavity 31. Alternatively, the first cleaning surface 3 can be used initially without any liquid solvent, then removed from the interior ball cavity 31 and cleaned, and then reinserted into the ball cavity 31 after the liquid solvent has been applied to its surface. The liquid solvent is then removed from the rollers 35 by the second cleaning surface 23 as it is scrubbing the rollers 35.

The purpose of the first cleaning surface 3 is to remove hair, lint or dust particles, or similar contaminants, from rollers 35 and mechanical parts 36 inside of the interior ball cavity 31. It has been found that a hook like surface, such as commonly used in a Velcro® fastener, is especially preferred for this task. Velcro® is a proprietary type of material that works through the use of two different surfaces that are generically referred to as a hook surface and a loop surface. The hook surface has a large number of small "hooks" that will grab or hook a large number of loops in the opposite surface to fasten the two surfaces together. There are many different ways to design a hook surface material, as well as many different grades of such materials available from different suppliers. The important characteristic, however the particular material is designed, is the mechanical ability to "grab" or "hook" something through a large number of small "hooks." In the case of the present invention, it is the "hooks" of the hook surface that grab or snare the hair, lint or dust particles and allow such contaminants to be removed from inside of the interior ball cavity 31. It is this type of material that is being referred to herein as a "hook material."

The purpose of the second cleaning surface 23 is to help remove residue from the rollers 35 and absorb any cleaning solution used with the first cleaning surface 3. The second cleaning surface 23 should be abrasive, but not so abrasive that it will be damaging to the rollers. The abrasiveness of the second cleaning surface 23 helps to polish the surface of the rollers 35. However, the second cleaning surface 23 should not leave any lint or residue on the rollers 35. Finally, the second cleaning surface 23 should be absorbent. Such a surface helps to pull dirt and contaminants into it, rather than leaving such materials on the surface of the rollers 35. It has been found that Scotch Brite® material is especially useful as the second cleaning surface 23.

The compressible materials 4 and 24 can be a foam, or other compressible materials. Although the use of compressible materials 4 and 24 is preferred, it is not required. The advantage of using such materials is that the cleaning surfaces 3 and 23 can be made in a shape that has a diameter that is greater than the diameter of the mouse ball, but they will still clean the rollers 35 and fit snugly against the rollers due to compression when either cleaning surface is simulating the movement of a mouse ball 32 against the rollers during cleaning. It has been found that it is especially preferred to use compressible materials 4 and 24 having a thickness of approximately one quarter of an inch.

In addition to cleaning the interior ball cavity 31, the mouse cleaner 1 can be used to clean the mouse ball 32. The ball cleaning surface 26 should be shaped so as to accommodate a rolling action of a mouse ball 32 within the ball cleaning surface 26 as shown in FIG. 4. In its most preferred form, the cleaning surface would be shaped so as to maximize the surface area of the ball cleaning surface 26 that is in contact with the mouse ball 32, to thereby allow the greatest amount of cleaning action to take place as the mouse ball 32 is rolled or rotated within the ball cleaning surface 26 during cleaning of the mouse ball 32. It is especially preferred that the ball cleaning surface 26 be made of the same material, with the same characteristics, as the second cleaning surface 23.

It should be noted, the cleaning surface 3, 23 may be made of materials other than those described above. For example, in one embodiment, the one or more cleaning surfaces 3, 23 may be disposable and pre-saturated with a cleaning chemical or solution such as isopropyl alcohol, avoiding the need to apply such a cleaning chemical or solution before cleaning the rollers and other mechanical parts of the mouse.

With reference to FIG. 5, a computer mouse cleaner 40 constructed in accordance with another embodiment of the invention will now be described. The mouse cleaner 40 includes a motor 42 for imparting rotational movement to the cleaning surface 3 at the first end 5 via a first shaft 44. A casing 46 of the motor 42 may be used as a handle for holding the mouse cleaner. The casing 46 may house one or more batteries for powering the motor 48. Alternatively, or additionally, the casing 46 may include an AC adapter port for connecting an AC adapter to power the motor 48. The motor 42 may include a switch 48, e.g., a multi-position switch, for activating the motor 42 to spin the cleaning surface 3. The mouse cleaner 40 may include a second cleaning surface 23 at the second end 25. The motor 42 may impart rotational movement to the second cleaning surface 23 via a second shaft 50. Although the first cleaning surface 3 and second cleaning surface 23 are shown as being a hook material and an abrasive, absorbent material, respectively, in alternative embodiments, the cleaning surfaces 3, 23 may include different cleaning surfaces, e.g., electrostatic, pre-saturated with cleaning solution. In a further embodiment, the mouse cleaner 40 may include the first cleaning surface 3 or the second cleaning surface 23, but not both. The cleaning surface(s) may also have a configuration other than cylindrical, e.g., spherical.

The switch 48 may be positioned in a first position to cause the motor 42 to rotate the first cleaning surface 3, a second position to cause the motor 42 to rotate the second cleaning surface 23, and a third, off position.

The method of use of the mouse cleaner 40 is similar to that described above, except instead of cleaning the inside of the mouse by manually rotating the respective cleaning surfaces 3, 23 via the handle 2, the switch 48 is positioned to cause the motor to rotate the respective cleaning surfaces 3, 23 via the corresponding shafts 44, 50. The motor 40 of the mouse cleaner 40 allows greater rotational speed and cleaning action than the mouse cleaner 1 described above for cleaning the inside of the mouse to remove hair, lint, dust, and residue from the rollers 35. Also, the advantages of the motorized mouse cleaner 40 over other mouse cleaners are similar to the advantages of a power drill or power screwdriver over a hand-crank drill or screwdriver. Having the motor 42 spin the cleaning surface 3, 23 makes it easier to keep the cleaning surface 3, 23 in the center of the mouse cavity so as to clean more evenly and more quickly. Keeping the cleaning head in the center of the mouse cavity helps to avoid potential damage to the mouse, rollers, or the cleaning surface 3, 23 caused by putting a disproportionate amount of pressure on one side of the cavity.

Figure 6:
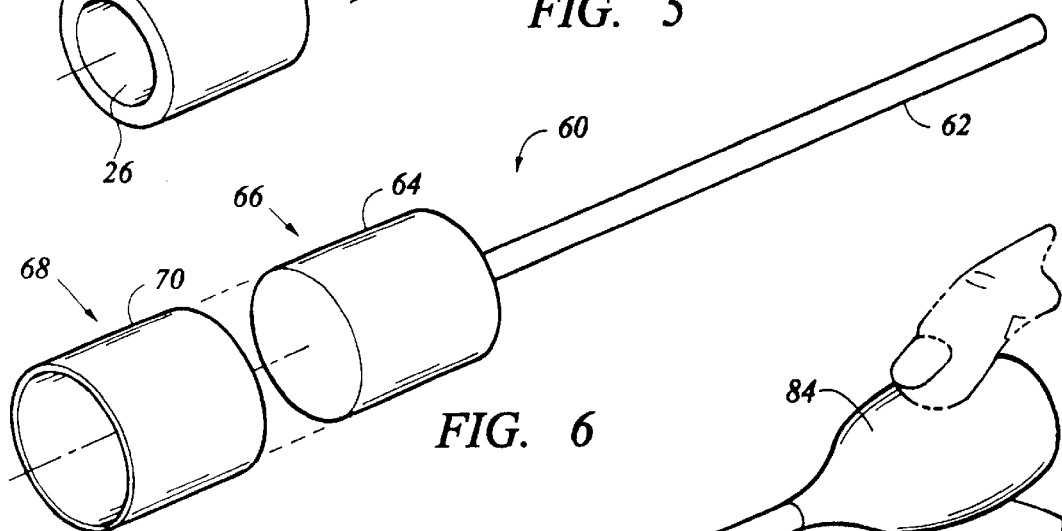
FIG. 6 is a drawing of a further embodiment of a computer mouse device cleaner made in accordance with the present invention.

With reference to FIG. 6, a mouse cleaner 60 constructed in accordance with a further embodiment of the invention will be described. The mouse cleaner 60 includes a handle 62 with a cylindrical attachment member 64 located at one end 66. One or more different cylindrical cleaning sleeves 68 may slidably attach to the attachment member 64 by sliding the cylindrical sleeve 68 over the attachment member 64 until it connects with the attachment member 64 by a snap fit, a friction fit, or some other means of connection. Each cleaning sleeve 68 has an external cleaning surface 70. Multiple cleaning sleeves 68 may come with the handle 62 and attachment member 64 in a mouse cleaner kit. One or more of the sleeves 68 in the kit may be the same or different and are preferably disposable after a single use. Exemplary sleeves include cleaning surfaces 70 such as a Velcro® fastener hook-like surface, a mildly abrasive, absorbent cleaning surface 70 such as Scotch Brite®, an electrostatic material, and a material pre-saturated with cleaning solution.

Figure 7:
FIG. 7 is a drawing of a still further embodiment of a computer mouse device cleaner made in accordance with the present invention.

With reference to FIG. 7, a mouse cleaner 80 constructed in accordance with a still further embodiment of the invention will now be described. The mouse cleaner 80 includes a hollow handle 82 with a lumen extending longitudinally therethrough. A pressure mechanism such as a squeezable bladder 84 is detachably connected to a first end 86 of the hollow handle 82. A cylindrical cleaning member 87 with a cleaning surface 88 is connected to a second end 90 of the hollow handle 82. The cleaning member 87 includes an interior. The surface 88 may include multiple pores 91 that communicate with the interior of the cleaning member 87 and the internal lumen of the handle 82. The bladder 84 and/or handle 82 may include cleaning solution, e.g., a liquid solvent such as isopropyl alcohol. By squeezing the bladder 84, cleaning solution is delivered to the cleaning surface 88 via the pores 91. The cleaning solution helps facilitate cleaning of the rollers and other mechanical parts of the mouse. Although the delivery of cleaning solution is described in conjunction with a squeezable bladder pressure mechanism, other devices, e.g., syringe, squeezable handle 62, pump, may be used as a pressure mechanism to deliver cleaning solution to the cleaning surface 88.

In an alternative embodiment, the mouse cleaner 80 may be used to apply a vacuum force within the mouse to remove dirt, dust, and other debris from the inside of the mouse. In this embodiment, the mouse cleaner 80 does not include cleaning solution. Dirt, dust, and other debris may be removed from inside of the mouse by squeezing the bladder 84 prior to introducing the cleaning surface 88 into the mouse and releasing the bladder 84 after introducing the cleaning surface 88 into the mouse. Releasing the bladder causes air to be drawn into the hollow handle 82 and bladder 84 via the pores 91. In alternative embodiments, other vacuum-creating devices may be used besides the bladder 84.

In a further embodiment, instead of controlling the delivery of cleaning solution, a mouse cleaner similar to mouse cleaner 80 illustrated in FIG. 7 may be used to inflate and deflate an expandable and collapsible mouse-cleaning member 87. The mouse-cleaning member 87 may be an inflatable balloon, bladder, or other body with a cleaning surface similar to any of those described above. The mouse-cleaning member 87 may be introduced into the mouse in a collapsed state and expanded within the mouse by squeezing the bladder 84 or through use of another pressure mechanism. In its expanded state, the mouse-cleaning member 87 preferably has a diameter that is greater than the diameter of the mouse ball for cleaning the rollers 35 by fitting snugly against the rollers due to compression. In its expanded state, the mouse-cleaning member 87 is small enough in diameter to allow the mouse-cleaning member 87 to rotate or swivel in the mouse for better cleaning action. As discussed above, the cleaning member 87 may have configuration other than cylindrical, e.g., spherical.

Figure 8:
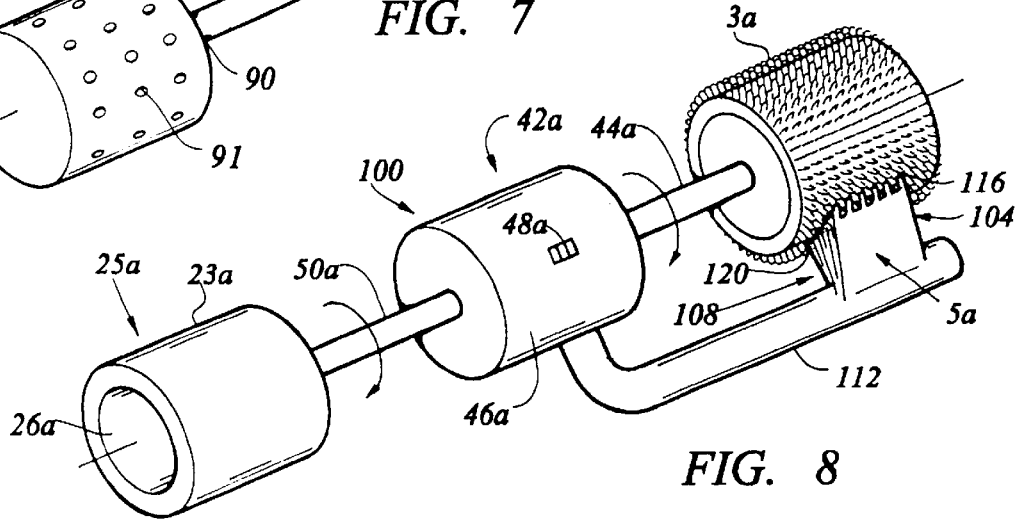
FIG. 8 is a drawing of yet a further embodiment of a computer mouse device cleaner made in accordance with the present invention.

With reference to FIG. 8, a mouse cleaner 100 constructed in accordance with a further embodiment of the invention will now be described. Elements similar to those described above for the mouse cleaner 40 with respect to FIG. 5 are identified with like reference numerals, but with an "a" suffix. The mouse cleaner 100 is similar to the mouse cleaner 40, but the mouse cleaner 100 further includes a cleaning surface cleaning mechanism 104 to remove dirt and other debris collected on the cleaning surface 3a during cleaning and an electrostatic mechanism 108 to add an electrostatic charge to the cleaning surface 3a. Both the cleaning surface cleaning mechanism 104 and the electrostatic mechanism 108 may be carried by a generally L-shaped support 112. The support 112 may be connected to the motor casing 46a. The cleaning element(s) of the cleaning surface 3a are preferably made of plastic, paper, or other material that is made of atoms that are susceptible to losing their electrons. The cleaning surface cleaning mechanism 104 includes a comb-like configuration with tines 116 that help to remove hair, lint, dirt, and other debris from the cleaning element(s) of the cleaning surface 3a when the cleaning surface 3a is rotated by the motor 42a. The electrostatic mechanism 108 is preferably made of a metallic tinsel and includes sharp teeth 120 that contact the cleaning element(s) of the cleaning surface 3a when the cleaning surface 3a is rotated by the motor 42a.

The method of use of the mouse cleaner 100 is similar to that described above for the mouse cleaner 40, except when the cleaning surface 3a is rotated by the motor 42a, hair, lint, dust, and other debris on the cleaning element(s) of the cleaning surface 3a are removed from the cleaning element (s) by the tines 116 of the cleaning mechanism 104. Removing these contaminants from the cleaning surface 3a enhances the cleaning ability of the cleaning surface 3a. Next, as the cleaning surface 3a is rotated, the same cleaning element(s) are contacted by the sharp teeth 120 of the tinsel, electrostatic mechanism 108. The teeth 120 pull electrons off of the cleaning element(s), creating a positive electrostatic charge on the cleaning surface 3a. This electrostatic charge attracts dust and other charged particles to the cleaning surface 3a for enhanced cleaning of the hair, lint, dust, and residue from the rollers 35 and other mechanical parts of the mouse. Implementations of the embodiment of the invention described above may include one or more of the following: the cleaning surface cleaning mechanism 104 and the electrostatic mechanism 108 may be used while the cleaning surface 3a is inserted within the mouse, while the cleaning surface 3a is outside of the mouse, while the other cleaning surface 23a is in the mouse, the support 112 may be detachable or exist separately from the rest of the mouse cleaner 100, the support 112 may be adjustable or positionable so that is may be used with either cleaning surface 3a, 23a, and the support 112 may carry only one of the cleaning surface cleaning mechanism 104 and the electrostatic mechanism 108.

Accordingly, it will be readily apparent to those skilled in the art that still further changes and modifications in the actual concepts described herein can readily be made without departing from the spirit and scope of the invention as defined by the following claims.

What is claimed is:

1. A method for cleaning a computer mouse device with a computer mouse ball located in an interior ball cavity that has a plurality of mouse contact rollers, comprising:

removing the computer mouse ball from the interior ball cavity;

inserting a cleaning surface of a mouse cleaner into the interior ball cavity, the cleaning surface attached to a lumen and in communication with a pressure mechanism via the lumen, the cleaning surface including an expandable and collapsible body;

actuating the pressure mechanism so as to cause an operative effect at the cleaning surface, the operative effect being the expansion of the body within the mouse cavity so that the cleaning surface compresses against the mouse contact rollers; and rotating the cleaning surface so as to cause one or more of the plurality of mouse contact rollers to roll and thereby be cleaned by the cleaning surface.

2. The method of claim 1, wherein the pressure mechanism is a squeezable handle attached to the lumen.

3. The method of claim 1, wherein the pressure mechanism is a syringe attached to the lumen.

4. The method of claim 1, wherein the pressure mechanism is a pump attached to the lumen.

5. The method of claim 1, wherein the cleaning surface is pre-saturated with a cleaning substance.

6. The method of claim 1, wherein the cleaning surface is comprised of an abrasive, absorbent material.

7. The method of claim 1, wherein the cleaning surface is comprised of a hook material.

8. A computer mouse cleaner for cleaning a computer mouse device with a computer mouse ball located in an interior ball cavity that has a plurality of mouse contact rollers, comprising: an expandable and collapsible cleaning body including a cleaning surface and an interior; a lumen in communication with the interior of the expandable and collapsible cleaning body; a pressure mechanism in communication with the lumen and the interior of the expandable and collapsible cleaning body to expand the body when the body is within the mouse cavity so that the cleaning surface compresses against the mouse contact rollers to enhance cleaning of the mouse contact rollers.

9. The computer mouse cleaner of claim 8, wherein the pressure mechanism is a squeezable handle attached to the lumen.

10. The computer mouse cleaner of claim 8, wherein the pressure mechanism is a syringe attached to the lumen.

11. The computer mouse cleaner of claim 8, wherein the pressure mechanism is a pump attached to the lumen.

12. The computer mouse cleaner of claim 8, wherein the cleaning surface is pre-saturated with a cleaning substance.

13. The computer mouse cleaner of claim 8, wherein the cleaning surface is comprised of an abrasive, absorbent material.

14. The computer mouse cleaner of claim 8, wherein the cleaning surface is comprised of a hook material.

* * * * *